United States Patent
Ganesh et al.

(10) Patent No.: US 8,856,083 B2
(45) Date of Patent: Oct. 7, 2014

(54) FRAMEWORK TO OPTIMIZE DELETE ALL ROW OPERATIONS ON DATABASE OBJECTS TO IMPROVE THROUGHPUT, QUERY ABILITY AND FLASHBACK

(75) Inventors: Amit Ganesh, San Jose, CA (US); Niloy Mukherjee, Belmont, CA (US); Manosiz Bhattacharyya, San Jose, CA (US); Bipul Sinha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 844 days.

(21) Appl. No.: 11/450,092

(22) Filed: Jun. 9, 2006

(65) Prior Publication Data

US 2007/0288529 A1    Dec. 13, 2007

(51) Int. Cl.
*G06F 7/00* (2006.01)
*G06F 17/30* (2006.01)
*G06F 17/00* (2006.01)

(52) U.S. Cl.
CPC ............................. *G06F 17/30442* (2013.01)
USPC ........................................ 707/682; 707/686

(58) Field of Classification Search
USPC .......... 707/202, 203, 204, 205, 200, 999.102, 707/999.202, 755, 604, 661, 687, 674, 707/999.101, 999.103, 999, 102, 648, 682, 707/686; 714/1–15, 19; 715/200–277, 513; 719/316
See application file for complete search history.

(56) References Cited

U.S. PATENT DOCUMENTS

| | | | |
|---|---|---|---|
| 5,832,203 A * | 11/1998 | Putzolu et al. | 714/20 |
| 5,870,759 A | 2/1999 | Bauer et al. | |
| 5,870,765 A | 2/1999 | Bauer et al. | |
| 5,884,325 A | 3/1999 | Bauer et al. | |
| 5,903,898 A * | 5/1999 | Cohen et al. | 707/648 |
| 5,926,816 A | 7/1999 | Bauer et al. | |
| 5,963,959 A | 10/1999 | Sun et al. | |
| 6,023,695 A | 2/2000 | Osborn et al. | |
| 6,065,018 A * | 5/2000 | Beier et al. | 707/610 |
| 6,173,292 B1 * | 1/2001 | Barber et al. | 707/682 |
| 6,249,791 B1 | 6/2001 | Osborn et al. | |
| 6,275,832 B1 * | 8/2001 | Watts et al. | 1/1 |
| 6,289,335 B1 | 9/2001 | Downing et al. | |
| 6,708,179 B1 | 3/2004 | Arora | |
| 6,714,943 B1 | 3/2004 | Ganesh et al. | |
| 6,728,719 B1 | 4/2004 | Ganesh et al. | |
| 6,999,977 B1 * | 2/2006 | Norcott et al. | 707/203 |
| 7,058,664 B1 * | 6/2006 | Hsu | 707/200 |
| 7,111,020 B1 | 9/2006 | Gupta et al. | |
| 7,124,141 B2 | 10/2006 | Norcott | |

(Continued)

*Primary Examiner* — Jacob F Bétit
*Assistant Examiner* — Bao Tran
(74) *Attorney, Agent, or Firm* — Vista IP Law Group, LLP

(57) ABSTRACT

A bulk delete operation with reduced latency allows for retrieval of deleted data. Each database object holds a Delete SCN indicating when a bulk delete operation was last performed. Each row in the database object holds a Row Modification SCN indicating when the row was last updated. A bulk delete is performed by writing the old value of the Delete SCN to the undo tablespace and updating the Delete SCN. No undo information is stored for the rows. A write is performed by finding a deleted row, storing undo information for the deleted row and writing over the deleted row. To read from the database object, a rollback operation is performed, if necessary. Those rows are then retrieved for which the Row Modification SCN is higher than the Delete SCN and is less than or equal to the timestamp for the requested data.

21 Claims, 10 Drawing Sheets

(56) References Cited

U.S. PATENT DOCUMENTS

| | | | |
|---|---|---|---|
| 7,290,015 B1 * | 10/2007 | Singhal et al. | 1/1 |
| 7,756,838 B2 * | 7/2010 | Kulesza et al. | 707/682 |
| 8,572,331 B2 * | 10/2013 | Butterworth et al. | 711/154 |
| 2002/0078058 A1 * | 6/2002 | Bird et al. | 707/100 |
| 2002/0099684 A1 * | 7/2002 | Ardoin et al. | 707/1 |
| 2003/0046315 A1 * | 3/2003 | Feig | 707/512 |
| 2004/0030954 A1 * | 2/2004 | Loaiza et al. | 714/20 |
| 2005/0131966 A1 * | 6/2005 | Lou | 707/204 |
| 2005/0198032 A1 * | 9/2005 | Cochran | 707/10 |
| 2005/0240633 A1 * | 10/2005 | Krishnaswamy et al. | 707/200 |
| 2006/0004860 A1 * | 1/2006 | Liedes et al. | 707/104.1 |
| 2006/0080317 A1 * | 4/2006 | Feig | 707/9 |
| 2006/0248444 A1 * | 11/2006 | Vellanki et al. | 715/513 |
| 2006/0288047 A1 * | 12/2006 | Chron et al. | 707/200 |
| 2007/0136381 A1 * | 6/2007 | Cannon et al. | 707/200 |
| 2007/0288529 A1 * | 12/2007 | Ganesh et al. | 707/202 |

* cited by examiner

FRAMEWORK TO OPTIMIZE DELETE ALL ROW OPERATIONS ON DATABASE OBJECTS TO IMPROVE THROUGHPUT, QUERY ABILITY AND FLASHBACK

BACKGROUND OF THE INVENTION

1. Field of the Invention

This invention relates to database systems, and, in particular, to a system and method for performing a "delete all rows" operation on a database table or other database object.

2. Description of the Related Art

In database systems, a "transaction" refers to an atomic set of operations performed against a database, which may access, create, modify or delete database data or metadata. A "commit" occurs when the transaction has completed its processing and any changes to the database by the transaction are ready to be permanently implemented in the database system. Transaction log records can be maintained in a database system to allow data recovery in the event of an error, that may include hardware failure, network failure, process failure, database instance failure, data access conflicts, user errors, and statement failures in database access programs.

Various types of transaction log records can be maintained in a database system for data recovery. One type of log record that may be maintained is the "undo" record. Undo records contain information about changes that were introduced into the database system. For example, if a row in a table were modified, the changes will be stored in the undo record identifying the block of the database system that includes the modified table row.

Storing undo records provides for various additional features of the database system, such as a "flashback" feature and a "consistent read" feature. Flashback allows a user to retrieve older data from a database table, for example, to compare against a current version or to aid in troubleshooting. Consistent read ensures that long-running transactions will receive consistent versions of the data, even if the data has been modified during the transaction.

Because the undo tablespace is of limited size, undo records cannot be stored indefinitely. Therefore, database administrators may set a parameter known as "undo retention," which specifies how long undo records should be maintained. Flashback is guaranteed to produce an older version of the data as long as the data are within the undo retention time. Similarly, consistent read is guaranteed to produce consistent data as long as the read operation does not exceed the undo retention time.

Database tables may be separated into partitions, each of which represents a logical collection of the data within the table. For example, a table holding financial information may be separated into partitions representing fiscal quarters. Database tables, partitions of database tables, and other related objects may be collectively referred to as "database objects."

A database administrator may wish to delete all the information in a particular database object. For example, a database administrator may wish to delete all the financial information for the last fiscal quarter, in order create space to store financial data for an upcoming fiscal quarter. Performing a "delete all rows" operation, also referred to as a "bulk delete" operation, typically involves placing information for each row into the undo tablespace so that the information can be retrieved for a consistent read or a flashback. The runtime of the bulk delete operation is therefore linear with respect to the number of rows in the database object. The amount of undo tablespace used is also linear with respect to the number of rows in the database object. For large database objects, performing a bulk delete can be a time-consuming operation.

In order to find a lower latency solution, many database administrators choose to perform a "truncate" operation instead of a bulk delete. The truncate operation releases the tablespace in the database object without writing any information to the undo tablespace. Because the truncation operation does not store undo information for the deleted rows, the runtime is constant. However, when the truncate operation is used in place of the bulk delete operation, neither consistent reads nor flashbacks can be provided for the deleted data.

There is therefore a need in the art for a bulk delete operation with reduced latency that allows for retrieval of the deleted data.

SUMMARY OF THE INVENTION

The invention generally relates to a bulk delete operation with reduced latency that allows for retrieval of the deleted data. The deleted data may be retrieved, for example, to provide a consistent read or to provide a flashback.

One implementation of the invention uses System Change Numbers, also referred to as System Commit Numbers or SCNs, to record the relative times at which database operations occurred. An SCN is a system-wide variable that may be used as a timestamp. The SCN may be incremented every time a change to the database is performed. By storing the SCN for each operation that modifies the data, the SCNs may be used to determine the order of the operations.

In order to implement the invention, the header of each database object may be modified to hold a variable termed "Delete SCN." The Delete SCN may provide a timestamp to show when a "delete all rows" (or "bulk delete") operation was last performed on the database object.

The header of each row in the database object may also be modified to hold a variable termed "Row Modification SCN." The Row Modification SCN may provide a timestamp to show when the row was last updated.

In order to perform a bulk delete on a database object, the Delete SCN for the database operation may be updated with the current system-wide SCN. The previous value of the Delete SCN may be stored in the undo tablespace. The rows of the database object are not altered, and no undo information is stored for the rows of the database object. The bulk delete therefore involves only one change to the database object and one write to the undo tablespace, regardless of the number of rows in the database object. Bulk delete therefore becomes an extremely low-latency operation.

In order to write a new row into the database object, a deleted row is found in the database object. The data for the deleted row will still be found in the database object, but has not yet been written to the undo table space. If appropriate, the information for the deleted row will be written into the undo table space before the new row is written into the database object. In cases where it is necessary to write this information to the undo tablespace, the write operation may therefore become slightly more time-consuming than in previous solutions. In some cases, it is not necessary to write information for the deleted row to the undo tablespace, as described below.

Previous solutions required storing undo information for each row in the table at the time of the bulk delete. The current solution allows the undo information to be stored at a later time, when a future operation writes over a deleted row. The current solution may therefore be viewed as amortizing the cost of a bulk delete over future write operations. However, in many cases, a new row may write over a deleted row without storing information for the deleted row to the undo tablespace. If, at the time of the write operation, the deleted row is older than the undo retention time, it is not necessary to store undo information for the deleted row. The cost of storing the undo information for that particular row is therefore eliminated altogether. Therefore, the current solution reduces the overall cost of performing the bulk delete operation, in addition to amortizing the cost over future write operations.

In order to retrieve data from the table (either current data or an older version of the data), it is first determined whether a "rollback" operation needs to be performed to retrieve data from the undo tablespace. This can be performed by comparing the Delete SCN for the database object to the timestamp for the requested data. If the Delete SCN for the database object is less than or equal to the timestamp for the requested data, the request is for current data and no rollback needs to be performed. However, if the Delete SCN for the table is greater than the timestamp for the requested data, a rollback is performed using information from the undo tablespace. In order to retrieve the appropriate data, those rows are retrieved for which the Row Modification SCN is higher than the Delete SCN, indicating that the data has not been deleted, and for which the Row Modification SCN is less than or equal to the timestamp for the requested data, indicating that the data was present at the time of the requested data.

When a bulk delete is performed, the deleted rows may remain in the database object rather than being written to the undo tablespace. Thus, in many cases, a flashback or a consistent read will request an older version of the data, and some or all of the deleted data will be present in the database object. These deleted rows can be retrieved directly from the database object, and the number of reads from the undo tablespace can be reduced or eliminated. Because a deleted row may be retrieved without performing a read from the undo tablespace in many cases, the average cost of retrieving a deleted row is also reduced.

Many factors may contribute to the "cost" of performing a transaction. These factors include the time it takes to perform the transaction, the memory needed to perform the transaction, and other similar factors. Although time will be considered the primary factor involved in evaluating the cost of a transaction, it is noted that other factors may also be affected.

In many database systems, I/O operations are among the most time-consuming. Each time a read or write is performed on to the undo tablespace, the cost of the transaction is therefore increased. By limiting the read operations and write operations to the undo tablespace, the cost of performing various database transactions may be reduced.

DETAILED DESCRIPTION

Methods and apparatuses for data recovery are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

In implementations of the invention, rather than deleting all the information from a database object to perform a bulk delete, a field in the header of the database object is set at the time the bulk delete is performed. Setting the field is an indication that a bulk delete has been performed on the database object, and that the information in the database object should be considered to be erased.

Bulk Delete Operation

Figure 1:
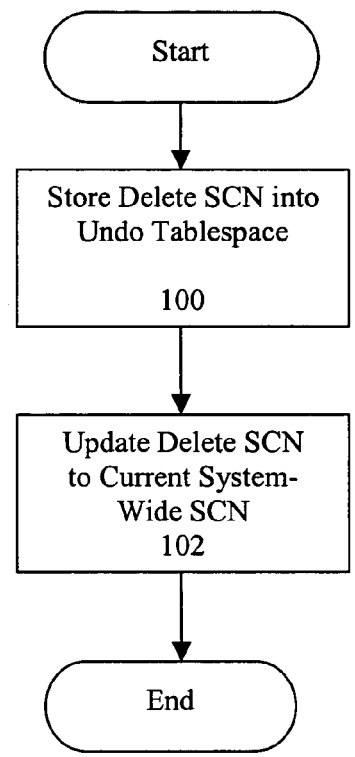
FIG. 1 is a flow chart illustrating a method for performing a bulk delete operation, in accordance with embodiments of the present invention.

FIG. 1 is a flow chart illustrating a method for performing a bulk delete operation on a database object, in accordance with embodiments of the present invention. As shown in FIG. 1, the method may begin in step 100, wherein the value of a Delete SCN field may be stored in an undo tablespace. The method may continue in step 102, wherein the Delete SCN field may be updated to reflect the current system-wide SCN. The method may then end.

In one implementation, the rows of the database object are not altered, and no undo information is stored for the rows of the database object. The bulk delete therefore involves only one write to the undo tablespace, regardless of the number of rows in the database object, an is therefore an extremely low-latency operation.

Database Object Example

Figure 2:
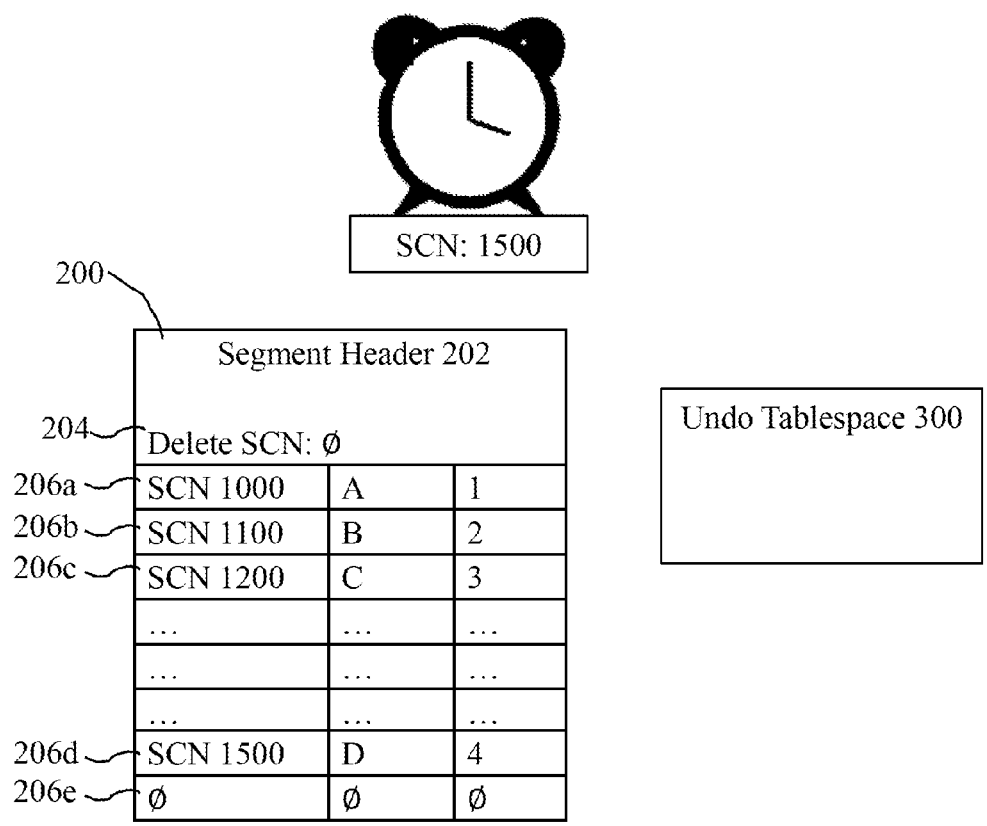
FIGS. 2-8 illustrate a database system in which various operations are performed, in accordance with embodiments of the present invention.

FIGS. 2-5 illustrate a database system in which various operations are performed, in accordance with embodiments of the present invention. As shown in FIG. 2, a database system may contain a database object 200, such as a database table or a database table partition. The database object 200 may contain a header 202, which contains information for the database object 200. The header 202 may contain a Delete SCN field 204, which is a field that holds an SCN indicating the last time at which a bulk delete operation was performed on the database object 200. As shown in FIG. 2, if a bulk delete operation has not been performed on the database object 200, the value of the Delete SCN field 204 may be null.

The database object 200 may also contain a plurality of rows 206, each of which contains a row header and other row data, such as, in the example of FIG. 2, a row name and a row identifier (row ID). Those skilled in the art will recognize that the row data could include any data that a user wishes to store in database object 200. The row header for each row may contain a Row Modification SCN, which is used as a timestamp to show when the row was last modified.

The system may also contain undo tablespace 300, which may be used to store undo information for the database object 200 and optionally for other database objects as well. The undo tablespace 300 may store undo information that is sufficient to restore the database object 200 to an earlier state. For example, the undo tablespace 300 may store undo information for all uncommitted transactions, such that if a transaction fails to commit, the database object 200 may be restored. The undo tablespace 300 may also store undo information for committed transactions, as long as the undo information is younger than the undo retention time. Storing undo information for committed transactions allows for rollback operations on the database object 200 to provide for flashback operations or for consistent reads. As shown in FIG. 2, the undo tablespace 300 may initially be empty.

The system may also contain a system-wide SCN 400, which is incremented every time a change to the database object 200 is made. By storing the system-wide SCN 400 when various transactions occur, the stored SCNs can be used as timestamps to determine the order of the transactions. Because the system-wide SCN is used as a timestamp, the value of the system-wide SCN may be considered to represent the time. Thus, for the purposes of the database system, when the system-wide SCN is equal to 1000, the time may be considered to be t=1000.

In the example shown in FIG. 2, when the system-wide SCN has a value of 1000 (t=1000), row 206*a* is inserted into the database and the row modification SCN for row 206*a* is set to 1000. At a later time, when the system-wide SCN has a value of 1100 (t=1100), row 206*b* is inserted into the database and the row modification SCN for row 206*b* is set to 1100. Subsequent rows 206*c*-206*d* are inserted as the system-wide SCN increments to 1500. Rows 206*e* and 206*f* may be null.

The value of the system-wide SCN 400 may also be used to describe the state of the database object at various times. For example, when the system-wide SCN 400 has a value of 1500 (t=1500), the database object 200 appears as shown in FIG. 2. Thus, flashback operations or consistent read operations may use a system-wide SCN to describe a previous version of the database object 200. A flashback operation or consistent read operation may request the database object 200 shown in FIG. 2 by specifying the system-wide SCN of 1500. The system-wide SCN specified by the operation may be known as the "query time." For example, a flashback query executing at a later time t=1700 may request data as of the time t=1300. In this case, the query time is t=1300, because t=1300 specifies the version of the data that is requested.

Figure 3:
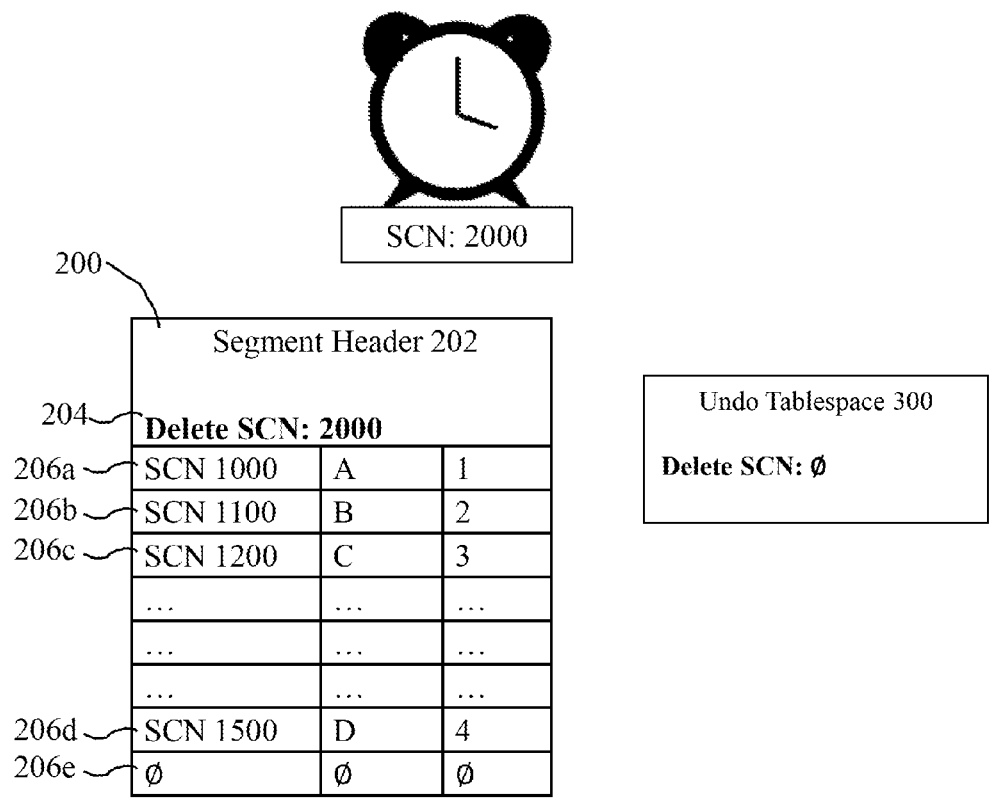

A bulk delete operation will now be described with reference to FIGS. 2-3. When the system-wide SCN 400 has a value of 2000 (t=2000), a bulk delete operation may be performed on the database object 200. In order to perform the bulk delete operation, the value of the Delete SCN field 204, presently null, may be written to the undo tablespace 300, as shown in FIG. 3. With further reference to FIG. 3, the value of the Delete SCN field 204 may be updated with the current value of the system-wide SCN 400, currently t=2000.

In performing the bulk delete operation, the data stored in the rows 206 is not altered, and undo information for the rows 206 is not stored in the undo tablespace.

If the bulk delete operation commits, the value of the Delete SCN field 204 remains at 2000. If an error occurs during the bulk delete operation and the operation does not commit, the previous value of the Delete SCN field is retrieved from the undo tablespace 300 and restored to the Delete SCN field 204. To continue the example, assume the bulk delete operation commits, and the system remains as shown in FIG. 3.

A query, such as a flashback operation or consistent read operation, now requests an older version of the database object 200. The query requests the version database object 200 as of time t=1200. Thus, the query time is t=1200.

In order to return the rows in the database object 200 that were present at the query time, the Delete SCN is compared to the query time. Because the Delete SCN (t=2000) is greater than the query time (t=1200), the Delete SCN 204 that is currently in the header is not the appropriate Delete SCN for the query time. Thus, a rollback is performed using the information in the undo tablespace until the Delete SCN 204 is less than or equal to the query time. In the present example, the rollback includes only changing the Delete SCN back to its previous value of null, thus returning the database to the state shown in FIG. 2. However, as will be discussed later, the rollback operation could include multiple modifications of the Delete SCN and/or the rows in the database object 200, and the rolled back version of the database is not always equivalent to a previous version of the database. The query then retrieves, from the rolled back database object 200 shown in FIG. 2, only those rows for which the Row Modification SCN is greater than the Delete SCN (presently null), and less than or equal to the query time. In the example shown in FIG. 2, the query retrieves rows 206*a*, 206*b*, and 206*c*. Other examples of retrieving data will be provided below. After the query executes, the database object 200 may be "rolled forward" and returned to the state shown in FIG. 3.

Figure 4:
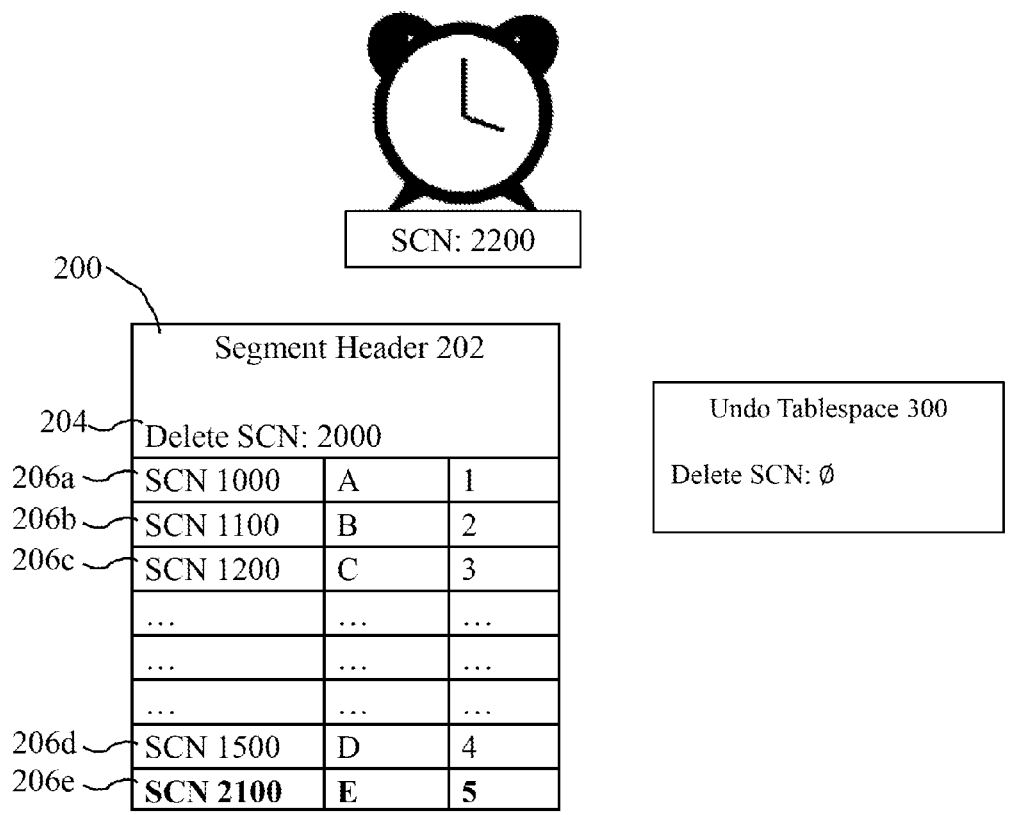

Referring to FIG. 4, a new row may be written to the database object 200 at time t=2100. Because the database object 200 contains empty row 206*e*, the new row may be written to the empty row 206*e*. At a later time t=2200, a query may then request a version of the database object as of time t=2100. Thus, the query time is t=2100.

In order to return the rows in the database object 200 that were present at the query time, the Delete SCN is compared to the query time. Because the Delete SCN (t=2000) is less than the query time (t=2100), the database object 200 contains all the necessary information to fulfill the query, and no rollback operation is performed. The query then retrieves only those rows for which the Row Modification SCN is greater than the Delete SCN and less than or equal to the query time. In the example shown in FIG. 4, the query retrieves only rows 206*e*.

Figure 5:
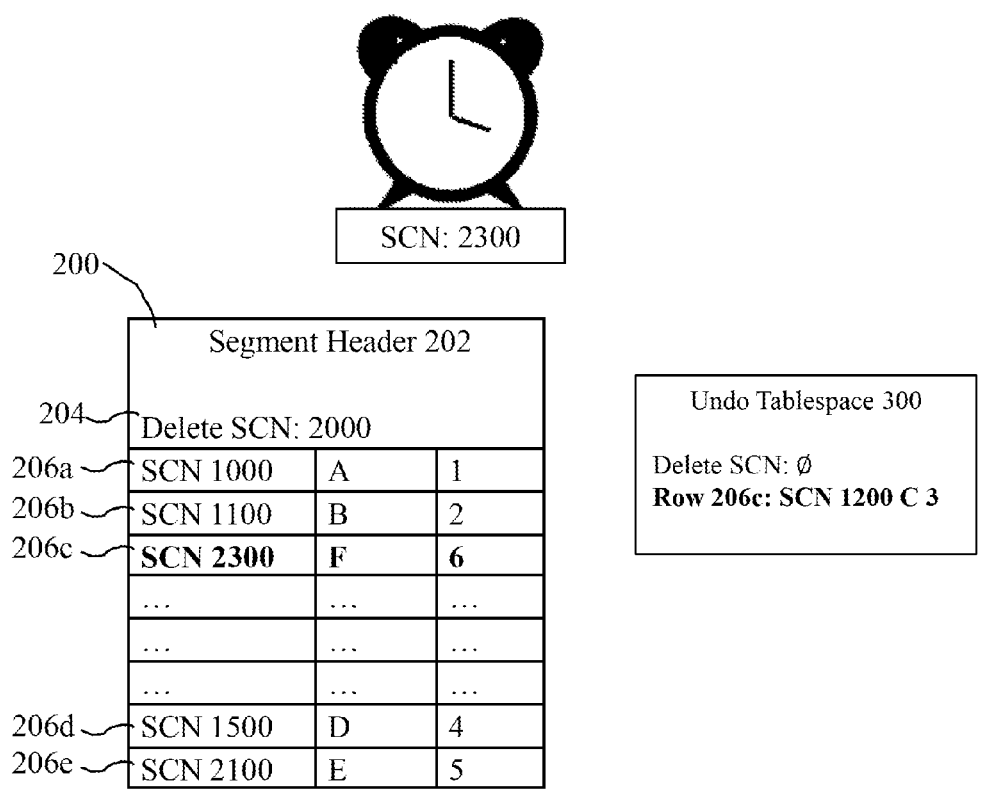

Referring to FIGS. 4 and 5, a new row may be inserted into the table at time t=2300. In order to insert a new row into the table, a row is located for which the Row Modification SCN is less than the Delete SCN. For example, referring to FIG. 4, row 206*c* may be selected because its Row Modification SCN, t=1200, is less than the Delete SCN, t=2000, indicating that the row has been deleted. The age of the deleted row will then be compared to the Undo Retention Time for the Database Object 200. For example, the Undo Retention Time may be set to be 2 days, indicating that after a row has been deleted from the database object 200, information about the row should be stored for 2 days in order for queries to access the old information. If the deleted row is younger than the Undo Retention Time, it is determined that information for the deleted row 206*c* should be stored.

In implementations of the invention, a background process may be used to determine whether the deleted row is younger than the undo retention time. As one particular example, a background process could maintain a conversion table that includes both real time and SCN numbers. At regular intervals, for example, every three seconds, the background process could store a new row containing the real time and the current SCN. The conversion table may also be monitored to delete rows once they become older than the undo retention time. In this particular implementation, in order to determine whether a deleted row 206*c* in the database object 200 is younger than the undo retention time, the Row Modification SCN for the deleted row 206 may be compared to the minimum SCN in the conversion table. If the Row Modification SCN is less than the minimum SCN in the conversion table, the deleted row 206*c* is younger than the undo retention time, and information for the deleted row 206*c* should be stored. Other implementations for determining whether deleted rows are younger than the undo retention time will occur to those skilled in the art.

To continue the earlier example, assume that it is determined that the deleted row 206*c* is younger than the undo retention time. Row information for the deleted row 206*c* is therefore written to the undo tablespace 300, as shown in FIG. 5. The information written to the undo tablespace 300 is sufficient to allow the deleted row 206c to be recreated for a flashback or a consistent read. If the difference between the Delete SCN and the Row Modification SCN had been greater than 1000, information for the deleted row 206c would not have been stored in the undo tablespace 300.

Once the information for the deleted row has been written into the undo tablespace 300, the new row is written over the deleted row 206c, as shown in FIG. 5.

In some implementations of the invention, the row that is written over may be selected to be the oldest row in the database object 200, or may be selected to be a row that is older than the undo retention time. If such a system is implemented, the number of writes to the undo tablespace may be still further reduced.

Figure 6:
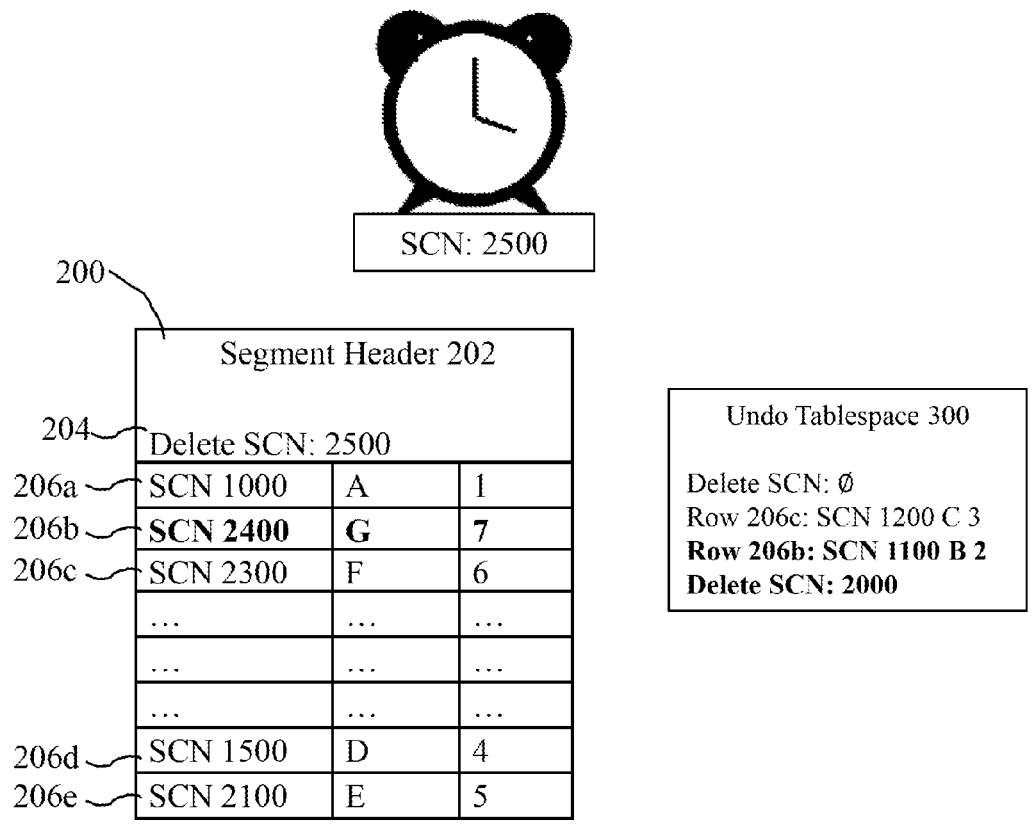

As shown in FIG. 6, at time t=2400, a new row may be inserted into row 206b. The undo information for the deleted row at 206b is stored in the undo tablespace, and a new row may be inserted at 206b. At time t=2500, a bulk delete operation may again be performed. The bulk delete operation may be performed by writing the Delete SCN into the undo tablespace and updating the Delete SCN with the current system-wide SCN of t=2500. As shown in FIG. 6, the information written into the undo tablespace is inserted in order or is otherwise linked, such that the undo operations can be performed in reverse order to correctly reconstruct previous versions of the database object 200.

As the information in the undo tablespace 300 becomes older than the undo retention time, the information in the undo table space may be deleted so that newer information may be stored. The undo tablespace 300 may retain information long enough so that the previous versions of the table can be reconstructed, as far back as specified by the undo retention time.

When a query requests an earlier version of a database object 200, it is first determined whether the Delete SCN 204 in the database object 200 is greater than the query time. If the Delete SCN 204 is greater than the query time, the undo table 300 may contain information necessary to fulfill the query. In this case, a "rollback" operation may be performed in order to retrieve the information from the undo tablespace 300 and return the database object 200 to an earlier state. The rollback operation includes implementing the undo information in reverse order, until a bulk delete operation prior to or equal to the query time has been performed.

However, if the Delete SCN 204 in the database object 200 is less than or equal to the query time, no rollback needs to be performed. All the rows that were present at the query time are still present in the database object, and the Delete SCN 204 is in the appropriate state.

For example, a query may request a version of the database object as of time t=2200. Because a bulk delete occurred at time t=2000, because row 206e was the only row written between time t=2000 and time t=2200, only row 206e should be returned.

In order to retrieve the appropriate information, it is first determined whether the Delete SCN, t=2500, is greater than the query time, t=2200. Because the Delete SCN is greater, the chain of undo information is performed in reverse order until a bulk delete operation prior to or equal to the query time has been performed. In this case, the most recent undo information, "Delete SCN: 2000," is the only undo operation that needs to be performed. However, in other cases, a plurality of undo operations may be performed before the bulk delete operation prior to or equal to the query time has been performed.

Figure 7:
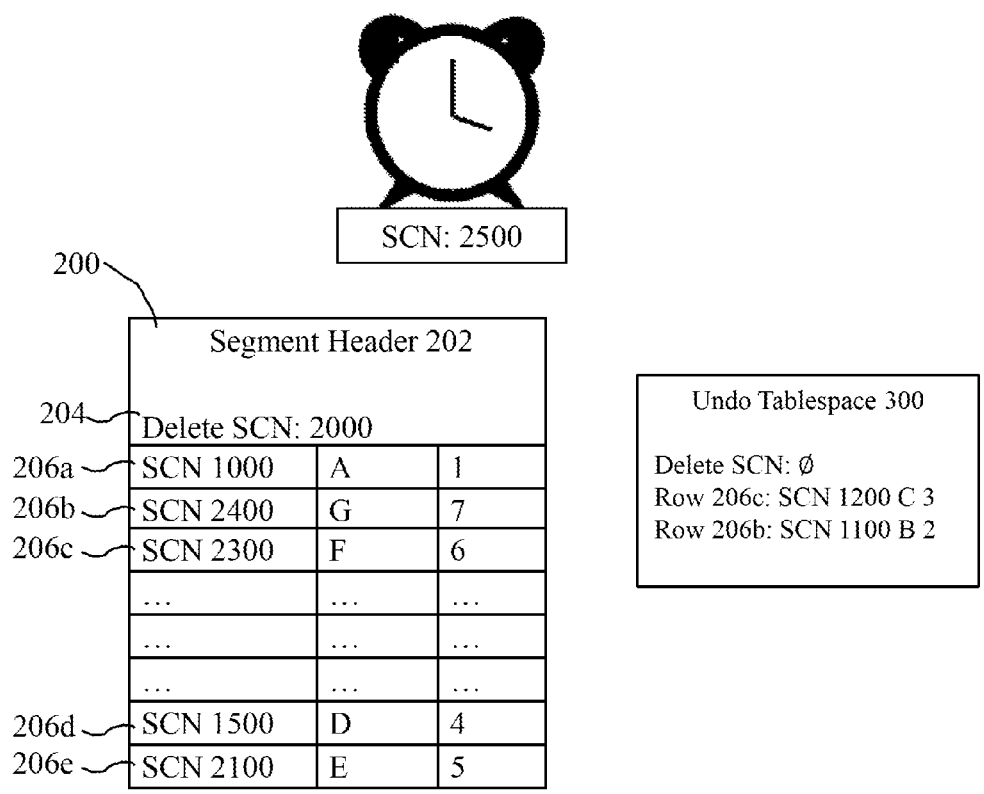

The table is rolled back by implementing the information from the undo tablespace in reverse order, in this case, rolling the Delete SCN back to 2000, as shown in FIG. 7. Note that in this case, the state of the table in FIG. 7 is not identical to the previous state of the table at the query time of t=2200. For example, rows 206b and 206c contain different values than they did at the query time of t=2200. However, the Delete SCN 204 has the same value that it did at the query time of t=2200, and all the rows that were in the database object 200 at the query time of t=2200 are present in the table. Thus, all the information necessary to reconstruct the table at the query time of t=2200 are contained in the table once the rollback has been completed.

Once a rollback has been performed, the appropriate information is retrieved. As described earlier, those rows are retrieved which have a Row Modification SCN greater than the delete time (currently t=2000), and which have a Row Modification SCN less than or equal to the query time (t=2200). As shown in FIG. 7, this will return row 206e. After the flashback or query has been performed, the database object 200 will be rolled forward again using techniques known in the art, such as techniques developed for used with flashback and consistent read operations. Continuing the example, the database object 200 will be rolled forward to the state shown in FIG. 6.

Returning to FIG. 6, as another example, a query may request the database object 200 as of time t=1800. In this case, it is determined that the Delete SCN 204 (t=2500), is greater than the query time (t=1800), and that rollback will again be performed.

Figure 8:
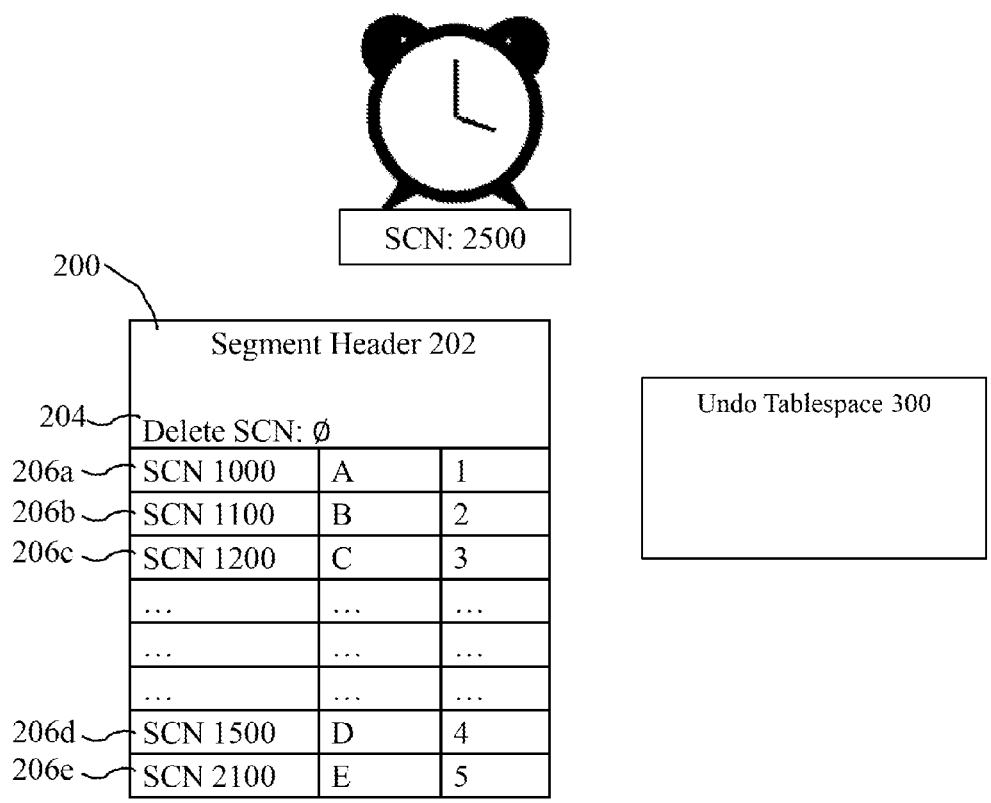

As shown in FIGS. 6 and 8, rollback is performed by implementing undo information in reverse order, first changing the Delete SCN 204 to its previous value of 2000, then replacing row 206b with the earlier values, replacing row 206c with the earlier values, and finally changing the delete SCN 204 to its previous value of null. When the Delete SCN 204 has been changed to a value less than or equal to the query time (t=1800), the rollback is complete, as shown in FIG. 8.

In some implementations, not all the undo information may be performed. For example, if the Delete SCN is to be changed more than once, the row modification information between two Delete SCNs may not be performed. As another example, instead of changing the Delete SCN multiple times, the Delete SCN may be changed only once, to a value less than or equal to the query time. Other modifications will occur to those skilled in the art.

In order to fulfill the query, the appropriate information is retrieved from the database object 200. As described earlier, those rows are retrieved which have a Row Modification SCN greater than the delete time (currently null), and which have a Row Modification SCN less than or equal to the query time (t=1800). As shown in FIG. 8, this will return rows 206a-d. After the query operation has been performed, the database object 200 will be rolled forward again using techniques known in the art, such as techniques developed for used with flashback and consistent read operations.

Inserting into the Database Object

Figure 9:
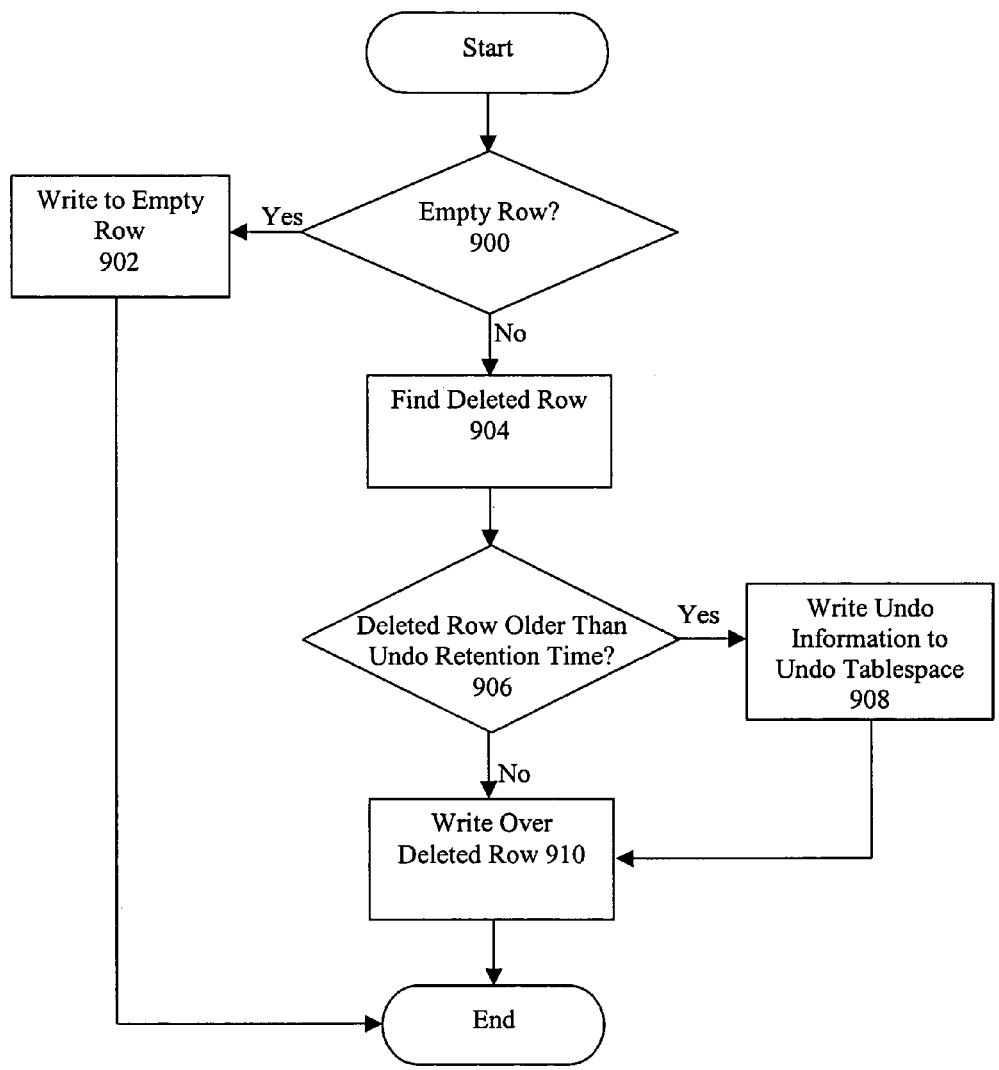
FIG. 9 is a flow chart illustrating a method for performing a write operation, in accordance with embodiments of the present invention.

FIG. 9 is a flow chart illustrating a method for performing a write operation, in accordance with embodiments of the present invention. As shown in FIG. 9, the method may begin in step 900, wherein it is determined if there is an empty row in the database object. If there is an empty row in the database object, the new row may be written to the empty row in step 902. If there is not an empty row, a deleted row may be found in step 904. The deleted row may be found, for example, by traversing the database object until a row is found with a Row Modification SCN that is less than the Delete SCN.

Once a deleted row has been found, it is determined in step 906 whether the deleted row is older than the undo retention time. The undo retention time may be the amount of time for which flashback operations and consistent reads are guaranteed, and may therefore be the amount of time that undo information must be stored for deleted rows. The undo retention time may be set, for example, by a database administrator, and may be in the range of several hours or several days.

If the deleted row is not older than the undo retention time, undo information may be necessary for flashbacks and consistent read operations to be performed. In this case, undo information is stored in the undo tablespace 908. The undo information stored is information sufficient to recreate the deleted row.

If the deleted row is older than the undo retention time, flashbacks and consistent reads are not guaranteed for the deleted row, because the deleted row is too old. In this case, no undo information is stored in the undo tablespace. Because writes to the undo tablespace are not performed for all deleted rows, the performance of the system may be improved.

Furthermore, in some implementations, the row that is written over may be selected to be the oldest row in the database object, or may be selected to be a row that is older than the undo retention time. If such a system is implemented, the number of writes to the undo tablespace may be further reduced.

In step 910, the new row is written over the deleted row, and the method may end.

Data Retrieval

Figure 10:
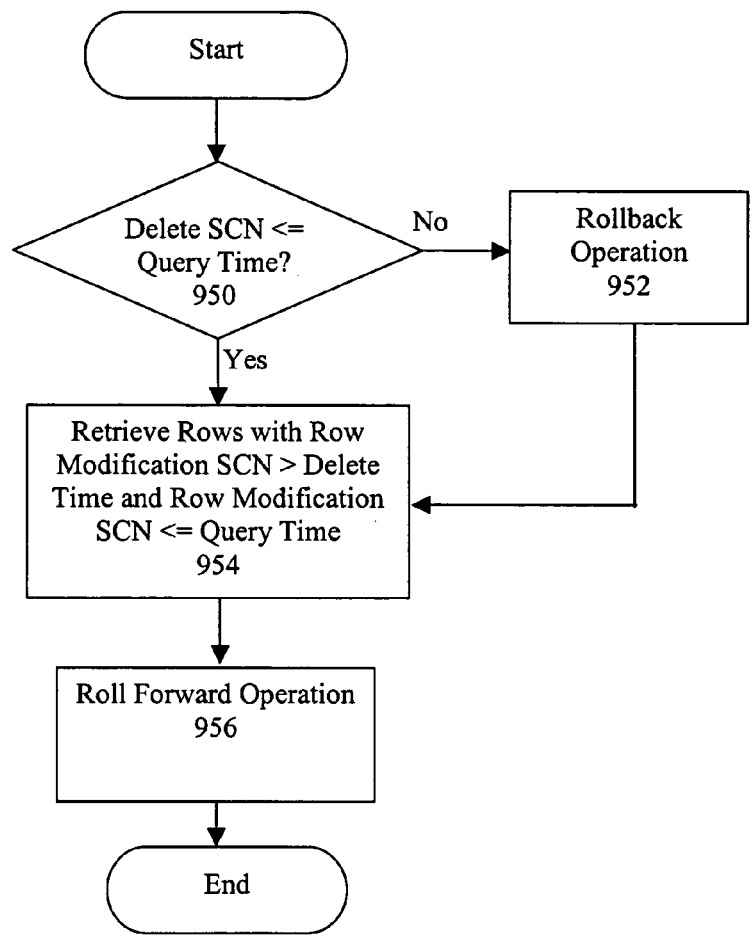
FIG. 10 is a flow chart illustrating a method for retrieving a prior version of a database object, in accordance with embodiments of the present invention.

FIG. 10 is a flow chart illustrating a method for retrieving data from a database object, in accordance with embodiments of the present invention. As shown in FIG. 10, current data may be retrieved from the database object, or a prior version of a database object may be retrieved for a query such as a flashback or a consistent read. The query may specify the prior version of the database object by identifying a system-wide SCN, such as specifying the database object as of a time t=1200. The system-wide SCN used to identify the version of the database may be referred to as the query time. If current data is requested, the current value of the system-wide SCN may be provided as the query time. Alternatively, the query time may be set to null, indicating that current data is desired. Other implementations will occur to those skilled in the art.

The method may begin in step 950, wherein it is determined if the Delete SCN of the database object is less than or equal to the query time. If the Delete SCN of the database object is less than or equal to the query time, all the information needed to fulfill the query is present in the database object, and no rollback need be performed.

If the Delete SCN is greater than the query time, a rollback operation is performed in step 952. Rollback may be performed by implementing undo information in reverse order until the Delete SCN has a value less than or equal to the query time. When the Delete SCN has a value less than or equal to the query time, the rollback is complete.

The results of the rollback operation do not necessarily return the database object to the state it was in at the query time. However, performing rollback ensures that the database object contains all the rows that were present at the query time, and also ensures that the database object contains the Delete SCN that was present at the query time. This ensures that the appropriate rows can be retrieved from the database object.

After the rollback has been completed, if necessary, the appropriate rows are retrieved from the database object 954. The appropriate rows are those rows for which the Row Modification SCN is greater than the Delete SCN (ensuring that the rows had not been deleted as of the query time), and for which the Row Modification SCN is less than or equal to the query time (ensuring that the rows had been place in the table as of the query time).

After the appropriate rows have been retrieved, the database object may be rolled forward, for example, using techniques known in the art and developed for flashback and consistent read operations While the invention has been described in terms of using SCNs as timestamps, those skilled in the art will realize that many types of information could be used in place of SCNs. In some implementations, the information used may specify realtime, while in other implementations, the information used may not describe realtime. Thus, any information which allows the sequence of various operations to be determined may be considered to be a "timestamp" for the purposes of the invention.

System Architecture Overview

The execution of the sequences of instructions required to practice the invention may be performed in embodiments of the invention by a computer system. In an embodiment of the invention, execution of the sequences of instructions required to practice the invention is performed by a single computer system. According to other embodiments of the invention, two or more computer systems coupled by a communication link may perform the sequence of instructions required to practice the invention in coordination with one another. In order to avoid needlessly obscuring the invention, a description of only one computer system will be presented below; however, it should be understood that any number of computer systems may be employed to practice the invention.

A computer system according to an embodiment of the invention will now be described according to an embodiment of the invention. As used herein, the term computer system is broadly used to describe any computing device that can store and independently run one or more programs.

Each computer system may include a communication interface coupled to the bus. The communication interface provides two-way communication between computer systems. The communication interface of a respective computer system transmits and receives electrical, electromagnetic or optical signals, that include data streams representing various types of signal information, e.g., instructions, messages and data. A communication link links one computer system with another computer system. For example, the communication link may be a LAN, in which case the communication interface may be a LAN card, or the communication link may be a PSTN, in which case the communication interface may be an integrated services digital network (ISDN) card or a modem.

A computer system may transmit and receive messages, data, and instructions, including program, i.e., application, code, through its respective communication link and communication interface. Received program code may be executed by the respective processor(s) as it is received, and/or stored in the storage device, or other associated non-volatile media, for later execution.

In an embodiment, the computer system operates in conjunction with a data storage system, e.g., a data storage system that contains a database that is readily accessible by the computer system. The computer system communicates with the data storage system through a data interface. A data interface, which is coupled to the bus, transmits and receives electrical, electromagnetic or optical signals, that include data streams representing various types of signal information, e.g., instructions, messages and data. In embodiments of the invention, the functions of the data interface may be performed by the communication interface.

Computer system includes a bus or other communication mechanism for communicating instructions, messages and data, collectively, information, and one or more processors coupled with the bus for processing information. Computer system 1400 also includes a main memory, such as a random access memory (RAM) or other dynamic storage device, coupled to the bus for storing dynamic data and instructions to be executed by the processor(s). The main memory also may be used for storing temporary data, i.e., variables, or other intermediate information during execution of instructions by the processor(s).

The computer system may further include a read only memory (ROM) or other static storage device coupled to the bus for storing static data and instructions for the processor (s). A storage device, such as a magnetic disk or optical disk, may also be provided and coupled to the bus for storing data and instructions for the processor(s).

A computer system may be coupled via the bus to a display device, such as, but not limited to, a cathode ray tube (CRT), for displaying information to a user. An input device, e.g., alphanumeric and other keys, is coupled to the bus for communicating information and command selections to the processor(s).

According to one embodiment of the invention, an individual computer system performs specific operations by their respective processor(s) executing one or more sequences of one or more instructions contained in the main memory. Such instructions may be read into the main memory from another computer-usable medium, such as the ROM or the storage device. Execution of the sequences of instructions contained in the main memory causes the processor(s) to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s). Such a medium may take many forms, including, but not limited to, non-volatile, volatile and transmission media. Non-volatile media, i.e., media that can retain information in the absence of power, includes the ROM, CD ROM, magnetic tape, and magnetic discs. Volatile media, i.e., media that cannot retain information in the absence of power, includes the main memory. Transmission media includes coaxial cables, copper wire and fiber optics, including the wires that comprise the bus.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method of performing a write operation on a memory occupied by a logically deleted row of a database object, comprising:
   identifying, by using a processor, the memory occupied by the logically deleted row of the database object for writing, wherein the logically deleted row was logically deleted from the database object in a previous logical collective delete operation without placing undo information for the logically deleted row data into an undo log, such that the logically deleted row is still present in the database object after its logical deletion and the logically deleted row could have been retrieved from the database object during a rollback operation without retrieving the undo information for the logically deleted row from the undo log, wherein the write operation occurs after the previous logical delete operation and placement of the undo information for the logically deleted row into the undo log is deferred until the write operation;
   determining whether the logically deleted row is older than an undo retention time;
   storing the undo information for the logically deleted row in the undo log in response to the write operation being requested on the memory occupied by the logically deleted row, wherein the undo information is stored based on the determination that the logically deleted row is not older than the undo retention time;
   writing new information to the memory occupied by the logically deleted row of the database object; and
storing the new information in the database object in a non-transitory computer usable medium or displaying the new information on a display device.

2. The method of claim 1, wherein identifying the memory occupied by the logically deleted row comprises:
   determining that a row modification timestamp for the logically deleted row is less than a delete timestamp for the database object.

3. The method of claim 2, wherein the row modification timestamp and the delete timestamp comprise System Change Numbers.

4. The method of claim 2, wherein the row modification timestamp and the delete timestamp comprise realtime information.

5. The method of claim 2, wherein the row modification timestamp and the delete timestamp do not contain realtime information.

6. The method of claim 2, wherein the row modification timestamp and the delete timestamp comprise information describing the sequence of various operations.

7. The method of claim 1, wherein the undo information is sufficient to recreate the deleted row.

8. A computer program product comprising a non-transitory computer usable medium having executable code to execute a process by a processor for performing a write operation on a memory occupied by a logically deleted row of a database object, the process comprising:
   identifying, by using a processor, the memory occupied by the logically deleted row of the database object for writing, wherein the logically deleted row was logically deleted from the database object in a previous logical collective delete operation without placing undo information for the logically deleted row data into an undo log, such that the logically deleted row is still present in the database object after its logical deletion and the logically deleted row could have been retrieved from the database object during a rollback operation without retrieving the undo information for the logically deleted row from the undo log, wherein the write operation occurs after the previous logical delete operation and placement of the undo information for the logically deleted row into the undo log is deferred until the write operation;
   determining whether the logically deleted row is older than an undo retention time;

storing the undo information for the logically deleted row in the undo log in response to the write operation being requested on the memory occupied by the logically deleted row, wherein the undo information is stored based on the determination that the logically deleted row is not older than the undo retention time;

writing new information to the memory occupied by the logically deleted row of the database object; and storing the new information in the database object or displaying the new information on a display device.

9. The computer program product of claim 8, wherein identifying the memory occupied by the logically deleted row comprises:

determining that a row modification timestamp for the logically deleted row is less than a delete timestamp for the database object.

10. The computer program product of claim 9, wherein the row modification timestamp and the delete timestamp comprise System Change Numbers.

11. The computer program product of claim 9, wherein the row modification timestamp and the delete timestamp comprise realtime information.

12. The computer program product of claim 9, wherein the row modification timestamp and the delete timestamp do not contain realtime information.

13. The computer program product of claim 9, wherein the row modification timestamp and the delete timestamp comprise information describing the sequence of various operations.

14. The computer program product of claim 8, wherein the undo information is sufficient to recreate the deleted row.

15. A system for performing a write operation on a memory occupied by a logically deleted row of a database object, comprising:

a computer processor to execute a set of program code instructions, in which the program code instructions comprises program code to:

identify the memory occupied by the logically deleted row of the database object for writing, wherein the logically deleted row was logically deleted from the database object in a previous logical collective delete operation without placing undo information for the logically deleted row data into an undo log, such that the logically deleted row is still present in the database object after its logical deletion and the logically deleted row could have been retrieved from the database object during a rollback operation without retrieving the undo information for the logically deleted row from the undo log, wherein the write operation occurs after the previous logical delete operation and placement of the undo information for the logically deleted row into the undo log is deferred until the write operation;

determine whether the logically deleted row is older than an undo retention time;

store the undo information for the logically deleted row in the undo log in response to the write operation being requested on the memory occupied by the logically deleted row, wherein the undo information is stored based on the determination that the logically deleted row is not older than the undo retention time;

write new information to the memory occupied by the logically deleted row of the database object; and store the new information in the database object in a non-transitory computer usable medium or displaying the new information on a display device.

16. The system of claim 15, wherein identifying the memory occupied by the logically deleted row comprises:

determining that a row modification timestamp for the logically deleted row is less than a delete timestamp for the database object.

17. The system of claim 16, wherein the row modification timestamp and the delete timestamp comprise System Change Numbers.

18. The system of claim 16, wherein the row modification timestamp and the delete timestamp comprise realtime information.

19. The system of claim 16, wherein the row modification timestamp and the delete timestamp do not contain realtime information.

20. The system of claim 16, wherein the row modification timestamp and the delete timestamp comprise information describing the sequence of various operations.

21. The system of claim 15, wherein the undo information is sufficient to recreate the deleted row.

* * * * *

UNITED STATES PATENT AND TRADEMARK OFFICE
CERTIFICATE OF CORRECTION

| | | |
|---|---|---|
| PATENT NO. | : 8,856,083 B2 | Page 1 of 1 |
| APPLICATION NO. | : 11/450092 | |
| DATED | : October 7, 2014 | |
| INVENTOR(S) | : Ganesh et al. | |

It is certified that error appears in the above-identified patent and that said Letters Patent is hereby corrected as shown below:

In the Specification

In column 4, line 30, delete "an" and insert -- and --, therefor.

Signed and Sealed this
Twenty-first Day of April, 2015

Michelle K. Lee
*Director of the United States Patent and Trademark Office*